T. H. NEAL.

Dummy Engine.

No. 1,620. Reissued Feb. 16. 1864.

Witnesses:

James J. Johnston
Alexander Hagg

Inventor:

Thomas H. Neal

N. PETERS, PHOTO-LITHOGRAPHER, WASHINGTON, D. C.

UNITED STATES PATENT OFFICE.

THOMAS H. NEAL, OF PITTSBURG, PENNSYLVANIA.

IMPROVEMENT IN RUNNING-GEAR OF LOCOMOTIVES.

Specification forming part of Letters Patent No. 39,060, dated June 30, 1863; Reissue No. 1,620, dated February 16, 1864.

*To all whom it may concern:*

Be it known that I, THOMAS H. NEAL, of Pittsburg, in the county of Allegheny and State of Pennsylvania, have invented a new and useful Improvement in the Running-Gear of Locomotives; and I do hereby declare that the following is a full and exact description thereof, reference being had to the accompanying drawings, and to the letters of reference marked thereon.

The nature of my invention consists in the use of a flange or disk placed on the inner or outer face of locomotive or car wheels for the purpose of forming a way or tread for the friction-rollers, which are used as a medium for transmitting motion by direct contact to the wheels resting on the rails.

My invention also consists in the use of two crank-shafts placed parallel to each other, with their cranks set at different angles, said shafts being connected by means of connecting-rods, endless chain, or other suitable device, the whole being constructed, arranged, and operating in the manner hereinafter described.

To enable others skilled in the art to make and use my invention, I will proceed to describe its construction and operation.

Figure 1:
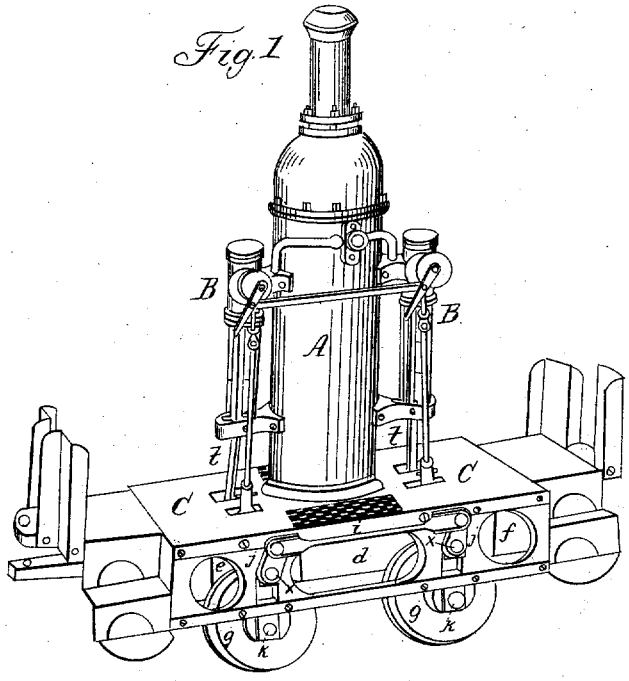
Figure 2:
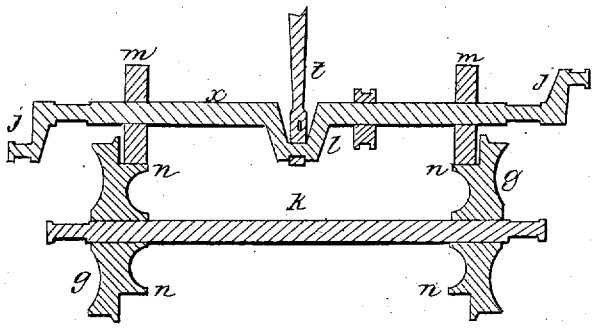

In the accompanying drawings, Figure 1 is a perspective view of a locomotive furnished with my improvement in running-gear. Fig. 2 represents a cut or sectional view of the wheels which rest on the rails, and also the friction-rollers which are used in connection with said wheels, and also represents the crank-shafts, showing their relative position to the friction rollers and the wheels with which the friction-rollers come in contact.

In the accompanying drawings the engines, boiler, water-tanks, and coal-bunkers are represented only for the purpose of showing their relative position to the parts constituting my invention.

It will be observed by reference to Fig. 2 that the crank-shaft X, to which are attached friction-rollers *m*, is placed directly over and parallel with the axles *k* of the wheels *g*, which rest on the rails, and that the friction-rollers *m* rest on the flanges *n*, cast on the face of the wheels *g*. This arrangement of the shaft X, friction-rollers *m*, flange *n*, wheels *g*, and axles *k* is the essential part of my invention, for unless this arrangement is substantially observed and adhered to for both the hind and fore wheels of the locomotive the invention will be inoperative.

In the accompanying drawings, A represents the steam-boiler, which is placed in the center of the car or locomotive. To the boiler A are attached the engines B, which operate the crank-shafts X by means of the connecting-rods *t*, which are attached to the "T" or "cross heads" of the engines and to the crank *l* of the shaft X, on the ends of which are placed cranks *j*, which are connected by means of rods *i*, which are used in connection with the cranks *j* for holding the engines at different angles, thereby avoiding what is known among engineers as "dead-centers." The frame-work of the car or locomotive is constructed so that the water-tanks *e* and *f* form the ends, and the sides are so arranged and constructed that the bearings for the shafts X are above the bearings of the axles *k* of the wheels *g*. The bearings of the shafts X and axles *k* may be mounted in the same manner as that practiced by machinists in mounting rolls for rolling-mills and in grooving-tools for tinners, which is, to place two bearings in the same pedestal. It is essential to the perfect working of the invention to arrange the bearings for the shaft X so that the entire weight of the boiler, engines, water-tanks, coal-bunkers, and frame of the car or locomotive will be brought to bear on the shaft X and friction-rollers *m*, which rest on the flanges *n* of the wheels *g*. This will cause the friction between the rollers *m* and flange *n* always to be proportionate to the weight or load of the car or locomotive. Thus the greater the load the greater will be the friction, and the lighter the load proportionately less will be the friction.

I wish it clearly understood that I do not confine myself to any particular manner of constructing the frame work of the car or locomotive. This I leave to the good judgment and skill of the mechanic. Neither do I confine myself to any particular form of the friction-rollers *m*, flanges *n*, or wheels *g*, as these things may be varied in form to suit the taste and desire of the mechanic; but the arrangement of the various parts as herein described and represented must be strictly adhered to, for the reason heretofore given.

The operation of my improvement is as follows: The engines B impart motion to the crank-shafts X, which impart motion to the friction-rollers *m*, which rest on the flanges *n*, and the friction between the rollers *m* and flanges *n* will impart motion to the wheels *g*, which rest on the rails.

The advantages of my improvement are as follows:

First. I obtain greater room on the platform C, which is accomplished by the use of the two crank-shafts X, placed above the axles *k* and parallel with them and with each other, thereby enabling me to place the boiler A and engines B in the center of the car or locomotive.

Second. By the use of the two crank-shafts X, I am enabled to use smaller wheels without danger of the cranks coming in contact with the ground or pavement of the track. Small wheels are less liable to fly the track than large wheels.

Third. By the use of the two crank-shafts X, rollers *m*, and their relation to the flanges *n* and wheels *g* greater traction is obtained between the wheels *g* and the rails by bringing the weight of the frame-boiler A, engines B, water-tanks *e* and *f*, and coal-bunkers *d* to bear equally on the wheels *g*.

Fourth. I avoid the noise caused by the use of cog-wheels by the use of friction-rollers *m* and flanges *n* in their stead.

Fifth. The self-regulation of the friction between the rollers *m* and flanges *n* by bringing the entire weight of the car or locomotive to bear on the crank-shafts X, thereby avoiding the use and the trouble attending the use of of set-screws.

Sixth. Economy in constructing locomotives for drawing street-cars by being enabled to use smaller engines and wheels.

Having thus described the nature, construction, operation, and advantages of my improvement, I wish it clearly understood that I do not claim, broadly, the use of friction-rollers when used in connection with the running gear of locomotives. Neither do I claim transmitting motion from the driving-shaft to the driven shaft by means of friction-rollers, for that device is described and represented in the patent granted to W. W. Virdin, July 5, 1859. Neither do I claim placing two bearings in the same pedestal, for that device is well known among machinists, as herein before stated; but

What I do claim as of my invention is—

1. The combination of the wheels *g*, flanges *n*, and friction-rollers *m* with the crank-shafts X, arranged and operating substantially as and in the manner herein described, for the purpose set forth.

2. The use of two parallel crank-shafts connected by means of connecting-rods, endless chains, or belts, when used in combination with the running-gear of locomotives, as herein described, and for the purpose set forth.

THOMAS H. NE

Witnesses:

JAMES J. JOHNSTON,

ALEXANDER HAYS.